Patented Nov. 23, 1937

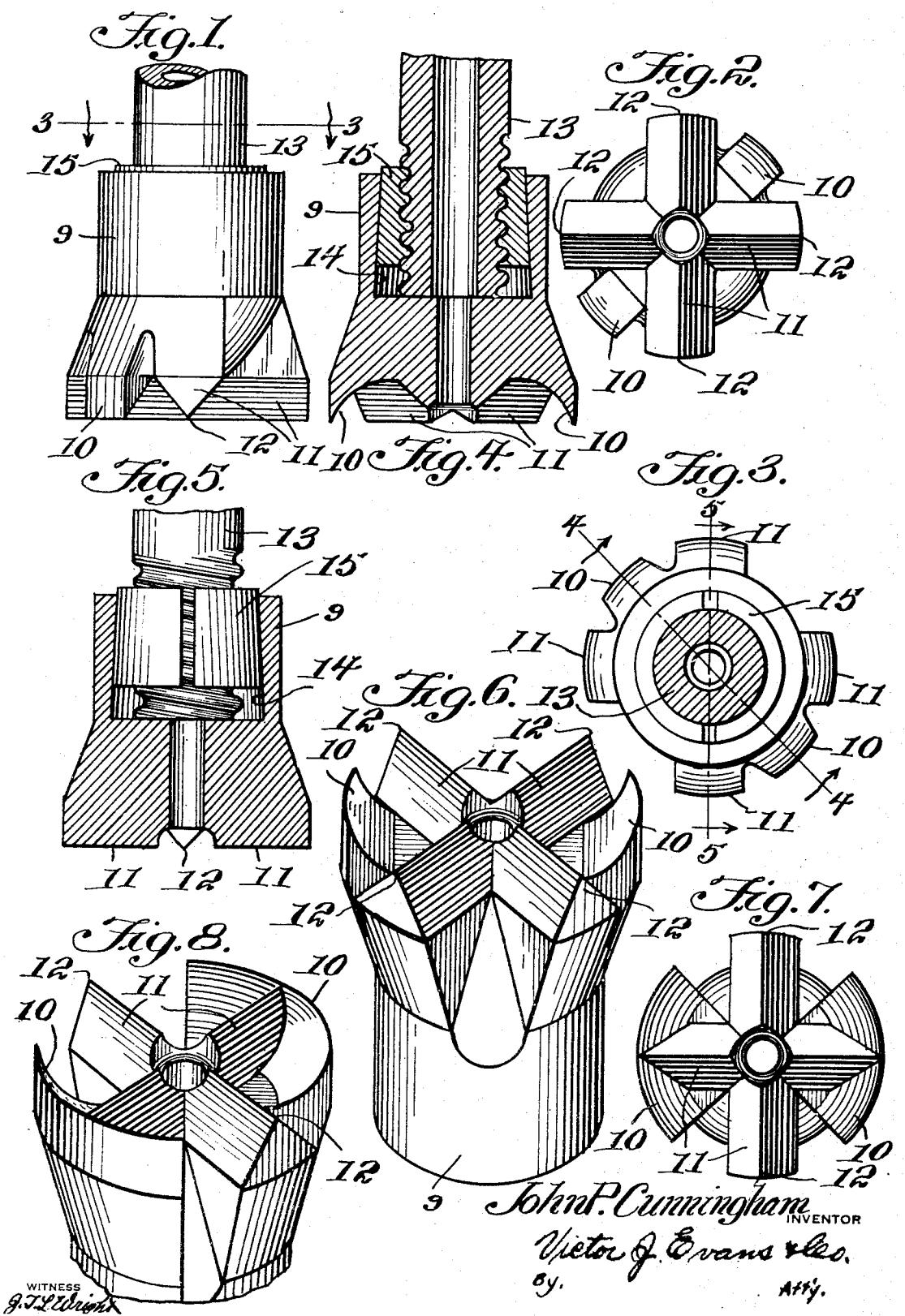

2,099,677

UNITED STATES PATENT OFFICE 2,099,677

ROCK OR EARTH DRILL BIT

John P. Cunningham, Kingman, Ariz.

Application March 19, 1936, Serial No. 69,661

1 Claim. (Cl. 255—64)

This invention relates to rock or earth drill bits and has for the primary object the provision of a device of this character which is provided with cross cutters and peripheral cutters cooperating with each other so as to form a hole of uniform size and free of flat and irregular walls and which will reduce drill bit sticking in the hole during drilling operation.

Another object of this invention is the provision of an improved means for detachably connecting the bit to a drill bar and which may be easily and quickly actuated for the application and removal of the bit from said drill bar.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a drill bit constructed in accordance with my invention.

Figure 2 is an end view illustrating the cutters of the drill bit.

Figure 3 is a sectional view taken on the line 3—3 of Figure 1.

Figure 4 is a sectional view taken on the line 4—4 of Figure 3.

Figure 5 is a sectional view taken on the line 5—5 of Figure 3.

Figure 6 is a perspective view illustrating the cutters of the drill.

Figure 7 is an end view illustrating a modified form of my invention.

Figure 8 is a perspective view illustrating the arrangements of the cutters of my modified form of invention.

Referring in detail to the drawing, the numeral 9 indicates a body of the drill bit having formed on the periphery of its working end, cutters 10 which are arranged at an angle to cross cutters 11 also formed on said working end of the body. The cutters 10 have arcuately curved cutting edges to cooperate with the cutters in preventing holes from being formed out of round and to relieve wear on the peripheral points 12 of the cutters 11, during a drilling operation. The cutters 10 may be arranged between the cutters 11, as shown in Figure 2, or may be arranged as shown in Figure 7.

The body 9 has formed therein a tapering socket 14 to receive a drill bar 13, the latter being threaded. A tapered split bushing 15 is received in the socket and has threaded engagement with the drill bar. The drill bar when screwed into the bushing comes to rest against the bottom wall of the socket and the bushing wedges against the tapered walls of the socket, thereby firmly securing the body of the drill bit to the drill bar.

Having thus described the invention, what I claim is:

A drill comprising a body having a tapered socket to receive a screw threaded end of a drill bar and a tapered split bushing located in said socket and internally threaded to be threaded on the drill bar and wedged against the tapering walls of the socket when the drill bar comes to rest on the bottom wall of said socket.

JOHN P. CUNNINGHAM.